J. B. CRAIG & M. HAUGHEY.
Police-Nippers.
No. 136,419.
Patented March 4, 1873.
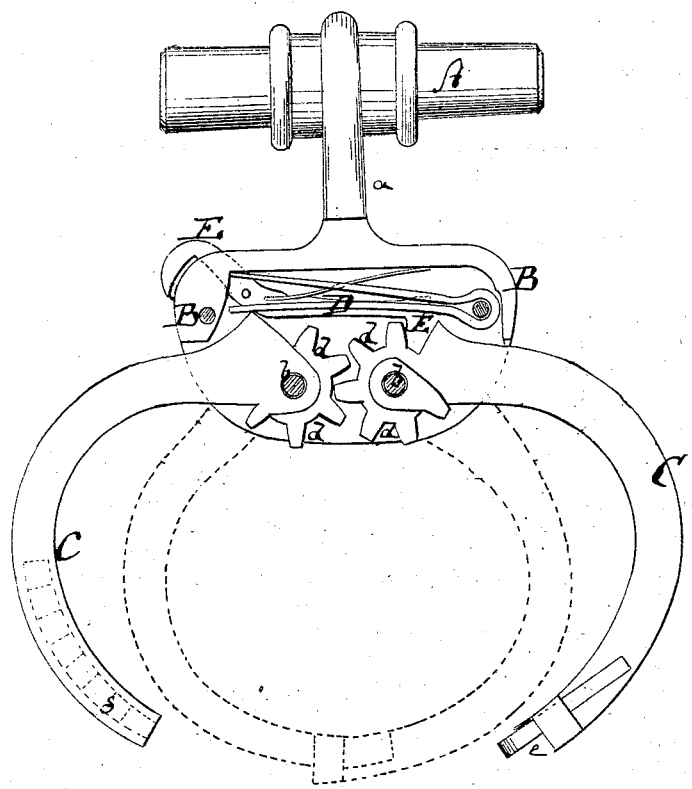
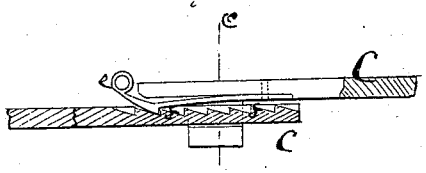
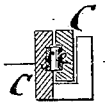
Witnesses:
Inventor:

UNITED STATES PATENT OFFICE.

JOHN B. CRAIG AND MICHAEL HAUGHEY, OF ST. LOUIS, MISSOURI.

IMPROVEMENT IN POLICE-NIPPERS.

Specification forming part of Letters Patent No. 136,419, dated March 4, 1873.

*To all whom it may concern:*

Be it known that we, JOHN BENTON CRAIG and MICHAEL HAUGHEY, of St. Louis, in the county of St. Louis and State of Missouri, have invented a new and useful Improvement in Police-Nippers, of which the following is a specification:

Figure 1 represents a sectional face view of our improved nippers. Fig. 2 is a detail section along the lower ends of jaws when locked. Fig. 3 is a transverse section thereof on line $c\ c$, Fig. 2.

Similar letters of reference indicate corresponding parts.

The invention relates to a policeman's nippers; and consists in certain features of improvement which will be first fully described and then clearly pointed out in the claim.

A in the drawing represents the handle of this improved instrument. It is, by a shank or stem $a$, connected with a sort of box or hollow case, B, between which two curved jaws, C C, are pivoted by pins $b\ b$. The pivoted ends of the jaws have toothed portions $d\ d$ meshing into each other to cause their simultaneous movement in opposite directions. D is a spring fitted into the box B and bearing against the edge of one jaw, C. E is a spring-trigger pivoted within the box C and catching into the teeth $d$ of the other jaw. When the jaws are in the position shown by full lines in Fig. 1, the trigger thus locking them, they are open and ready to be applied to the wrist of a prisoner. As soon as the trigger is touched the spring D will force the jaws shut around the prisoner's arm in the position shown by lower dotted lines in Fig. 1. In this position the lower ends of the jaws become locked together by a spring-catch, $e$, attached to one jaw and entering one of a series of notches, $f\ f$, in the other jaw, as shown in Fig. 2.

Having thus described our invention, we claim as new, and desire to secure by Letters Patent—

1. Nipper-jaws provided on their pivoted ends with a series of teeth gearing with each other, as and for the purpose specified.
2. The spring-catch $e$ on one jaw, C, combined with the notched other jaw on a nipper, as described.
3. The means of holding open the jaws, consisting of the spring-hook E locking with teeth $d$, as described.
4. The cap B, connected by neck $a$ with handle and applied to the jaws, as and for the purpose described.

JOHN BENTON CRAIG.
MICHAEL HAUGHEY.

Witnesses:
GEORGE M. PASCHALL,
WM. J. I. DOHERTY.